May 27, 1958

H. L. LANCE 2,836,084

TRACTOR TRANSMISSION

Filed Feb. 1, 1957

INVENTOR.
Hubert L. Lance

BY

*ATTORNEY*

May 27, 1958  H. L. LANCE  2,836,084
TRACTOR TRANSMISSION

Filed Feb. 1, 1957  2 Sheets-Sheet 2

INVENTOR.
Hubert L. Lance
BY
*C. M. Coffee*
ATTORNEY

United States Patent Office 2,836,084
Patented May 27, 1958

2,836,084

TRACTOR TRANSMISSION

Hubert L. Lance, Petersburg, Tex.

Application February 1, 1957, Serial No. 637,672

18 Claims. (Cl. 74—710.5)

This invention pertains to the transmission of power from the engine of a tractor to its driving wheels and more particularly to the division of power from a single shaft to the two driving axles.

The power transmission system of the conventional wheel type farm tractor imposes definite limitations on the operation of the tractor in the various uses to which it is normally put. The ideal transmission system would have all three of the following features or characteristics.

First: While being employed to haul trailers or other wheeled loads on highways, roads, yards and the like, where maneuverability and speed, rather than traction is the principal requirement, the tractor should have a conventional differential drive to the rear wheels, and brakes on each rear axle that act simultaneously from a single control pedal or other control device. The tractor is often operated at high speeds, and separate wheel brakes for sharp turns are dangerous for this type operation.

Second: While plowing, or performing other operations where traction rather than maneuverability is the principal requirement, the grip of the two rear wheels on the ground is never equal, due to variations in the texture, moisture, compaction, and other differences in the soil. Under these conditions a tractor with a differential drive is limited in the amount of power that may be delivered to the rear wheels by the amount of power that will cause the wheel with the poorest traction to break away and start to slip. This circumstance will limit the tractive effort of the tractor to a level that is appreciably less than what would be possible if slipping did not occur, and appreciably less than the engine would otherwise be capable of.

Under such conditions a system that would deliver power to the rear wheels with them locked together as if on a single axle and unable to turn independently, would be the ideal system. Under these conditions the arrangement of the brakes is not a matter of great concern.

Third: While plowing, and coming out of one set of furrows and entering the next, the tractor must turn on an extremely short radius, or "turn around one wheel." A fixed axle drive, as described in the second feature above, would not permit such a turn. With tractors of conventional differential drive such a turn is possible if the tractor is equipped with independent brakes on the rear wheels. Then by strong application of the brake on the inside wheel the tractor may be made to come around on a sufficiently short radius turn to enter the next set of furrows. There is, however, one grave difficulty to this system; namely, when one wheel of a differential drive is braked to a stop, the other must turn at twice speed, which, with constant horsepower would deliver half of the original torque. Thus, especially when the tractor is carrying plows or other implements attached directly to the tractor and where the plows or other implements must stay in the ground during the turn, it becomes necessary to shift to a lower gear to get power enough to make the turn. This additional torque delivered to the rear axles imposes additional load on the wheel brake, as it must overcome that torque delivered by the lower geared engine.

Under these conditions the ideal drive would be one wherein either wheel could be disconnected at will from the drive—by use of a suitable transmission mechanism—and the brake then applied to that dead wheel. Then, in making a short radius turn, the outside drive wheel would continue to rotate at a fixed speed relative to engine speed; consequently at no loss of driving torque. Also the brake only has to stop a dead wheel rather than a powered wheel—a far easier service for a brake.

An object of this invention is to provide a single tractor transmission which will have all three of the above ideal features.

Another object is a transmission which will provide a simple means for shifting from one type operation to another.

A further object is to provide a transmission which is safe, both as to damage to the transmission or injury to the operator.

Still further objects are to achieve the above with a device that is sturdy, simple, and reliable, yet cheap and easy to manufacture.

The specific nature of the invention as well as other objects, uses, and advantages thereof will clearly appear from the following description and from the accompanying drawing in which.

Figure 1:
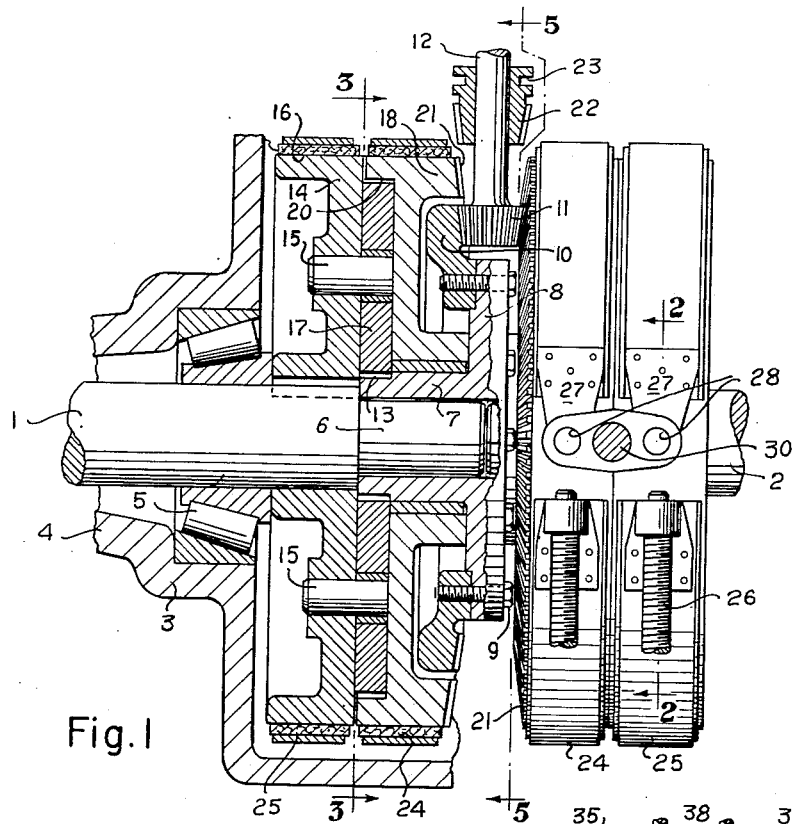
Fig. 1 is a top view of a transmission in accordance with this invention with the left side in section, and the right side with the housing broken away.

By reference to the accompanying drawing, it may be seen that the transmission is essentially two identical units, each transmitting power to its respective axle. Referring to Fig. 1, the mechanism consists of the two rear axle shafts 1 and 2, of the tractor. Only the inner ends of these axle shafts are shown, whereas they actually extend outward through the housing 3, shown broken away at 4, and carrying on their extreme outer ends the rear wheels of the tractor. They are guided and restrained at their outer ends in suitable bearings and oil seals mounted in the extension of the housing, not shown. Near their inner ends the axle shafts are mounted in suitable bearings 5 positioned in the housing 3 as shown. The innermost ends of the axle shafts are reduced in diameter as at 6. On these two abutting reduced diameter ends 6 of the axle shafts 1 and 2 and rotatable to them is mounted the ring-gear sleeve 7 and flange 8. The ring-gear sleeve 7 and the ring-gear flange 8 are one piece. The sleeve is a tubular member enclosing the reduced diameter ends 6 of the axle shafts 1 and 2, and it extends the full length of the two reduced diameter ends 6 of the axle shafts 1 and 2, from the shoulder on the left one to the shoulder on the right one. At the mid-point of the length of sleeve 7 and permanently fixed thereto is the ring-gear flange 8.

Thus far the mechanism as described consists of the two axle shafts 1 and 2 mounted in their respective bearings and each free to rotate independently. Enclosing the inner ends of these axle shafts and freely rotatable to each is mounted the ring-gear sleeve 7 and flange 8. Thus far all of these parts are free to rotate independently.

Securely affixed to the ring-gear flange 8 by bolts 9, or other suitable means, is ring-gear 10, which consists of a bevel gear flanged to mate with the ring-gear flange 8 and having gear teeth to mesh with the bevel drive pinion 11. Drive pinion 11 is fast to, and a part of drive shaft 12 which is mounted in its own bearings (not shown) and extends forward in the tractor to the stepped speed transmission. Shaft 12 transmits the power of the engine to the drive pinion 11, which in turn drives the ring-gear 10 and sleeve 7.

Figure 3:
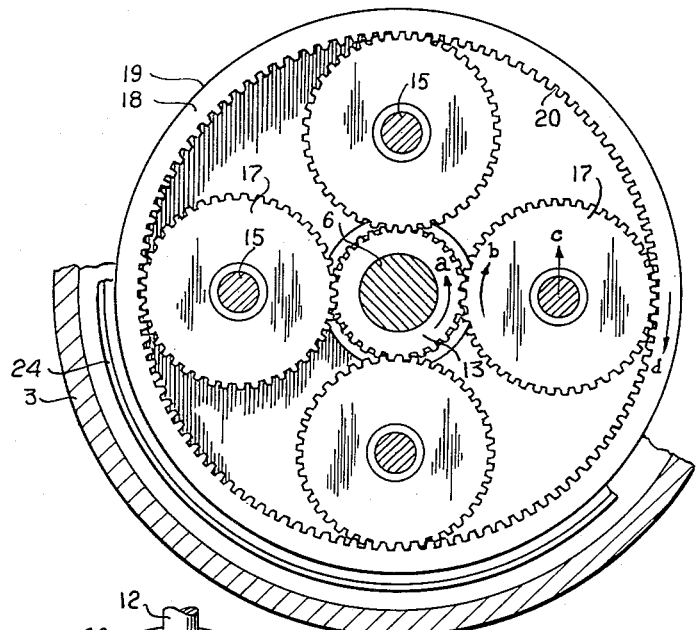
Fig. 3 is a cross-section taken on line 3—3 at Fig. 1 with the housing and brake band broken away.

On each end of sleeve 7 are gear teeth, which form the sun gears 13 also shown in Fig. 3.

From this point onward the construction of the right-hand and the left-hand units are identical, and use will be made of the view of either one as may be convenient, and it is to be understood that such views represent the construction of both units.

Mounted on axle shaft 1, and keyed and otherwise made fast to it, with its inner face even with the step or shoulder on the axle shaft 1, is first or outer brake drum 14. Solidly affixed to brake drum 14 and extending outward from its flat face are four equally spaced pins 15, also shown in Fig. 3. Brake drum 14 also has a smooth cylindrical outer surface 16 on which a first or outer brake band operates, as described later.

Rotatable mounted on the four pins 15 are four planet gears 17. These planet gears 17 each mesh with the sun gear 13 on the sleeve 7.

Rotatably mounted on the ring-gear sleeve 7 and extending on its bearing on sleeve 7 from the ring-gear flange 8 to the sun-gear 13, is second or inner brake drum 18. Drum 18 has an outer smooth cylindrical surface 19 suitable for a brake band, internal gear 20 engaging the planet gears 17, and a bevel gear face 21 so disposed as to engage with sliding pinion 22. Sliding pinion 22 is shown rotatably and slideably mounted on drive shaft 12, although it could as well be mounted on any other fixed axis in the same plane. Groove 23 in slide pinion 22 is for a shift yoke by which slide pinion 22 may be moved along shaft 12, until it engages the two bevel gear faces 21 on the two brake drums 18.

Figure 2:
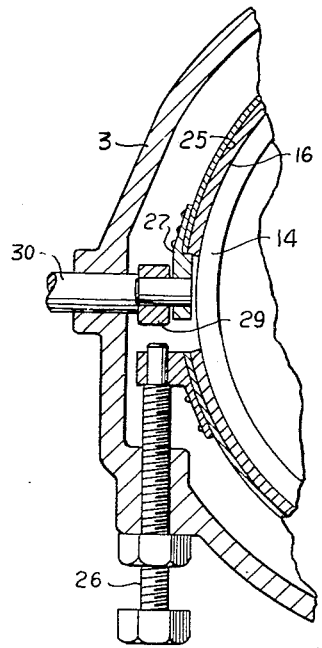
Fig. 2 is a detail of the brake band operator taken on line 2—2 of Fig. 1.

The brake drums 18 and the brake drums 14 (also called planet drum) are each encircled by inner brake bands 24 and outer brake 25, which are of conventional design and are adjustable at their fixed or dead ends by adjusting screws 26. The active ends of the brake bands 24 and 25 terminate in fittings 27 that carry pins 28 which engage with rocker arms 29. Rocker arms 29 are integral with control shafts 30 which extend through the housing 3, as shown in Fig. 2. Clockwise rotation of control shaft 30 on the right hand unit will release the inner band 24 on the inner drum 18 and will tighten the brake band 25 on the brake drum 14. The opposite rotation will have the opposite effect. An identical brake control mechanism is also included, but not shown on the left-hand unit. For it, a counter clockwise rotation will release the inner and apply the outer brake.

Figure 4:
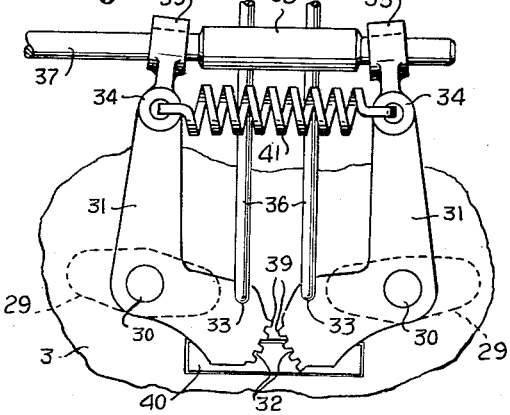
Fig. 4 is a top view of the brake operating mechanism taken from line 4—4 of Fig. 5.

Fig. 4 shows the rocker arms 29 for both the left-hand and the right-hand units, and the control shafts 30 for each rocker arm. Keyed to each control shaft 30 is a lever 31 which has a gear segment 32. Connected to levers 31 at pull-rod attachment 33 are pull-rods 36 going to foot pedals not shown. Through sleeves 35 on levers 31 passes a rod 37 loosely guided in sleeves 35. Between the sleeves 35 there is an enlarged portion 38 of rod 37 such that movement to the right by rod 37 will move the right lever 31 to the right, and right shaft clockwise. Movement to the left by rod 37 will move the left lever 31 to the left, and left shaft counter clockwise. Rod 37 may be actuated by a hydraulic servo-mechanism, or by other means under the control of the operator as may be convenient.

A tension spring 41 under strain connects levers 31 at each spring attachment 34 in such a way as to bias levers 31 toward each other.

Gear segments 32 on levers 31 are so designed that when either lever 31 rotated—whether actuated by rod 37 or by pull-rods 36—the gear segment on the rotating lever 31 will clear tip 39 of the gear segment 32 on the stationary lever 31 and be free to rotate unhindered. On the other hand, if both levers 31 are rotated simultaneously through a small angle by the pull rods 36 the two gear segments 32 will mesh and further rotation of the levers 31 will be synchronized, whether actuated by either pull-rod 36 or by motion in either direction by rod 37.

Beneath gear segments 32 and guided as described later in such a manner that it can only move up or down perpendicular to the plane of the paper as seen in Fig. 4, is a latch bar 40. This latch bar 40 is spring loaded in such a manner that it tends to rise vertically to the plane of the paper but is normally held down by either one or the other of the gear segments 32 being above it and preventing such motion. On the other hand, if both levers 31 are rotated so that the gear segments 32 mesh and move together as described above, then both gear segments will move off of latch bar 40 and it will rise by spring action to a position that will interfere with gear segments 32 returning to a position where they can disengage or become unmeshed.

Figure 5:
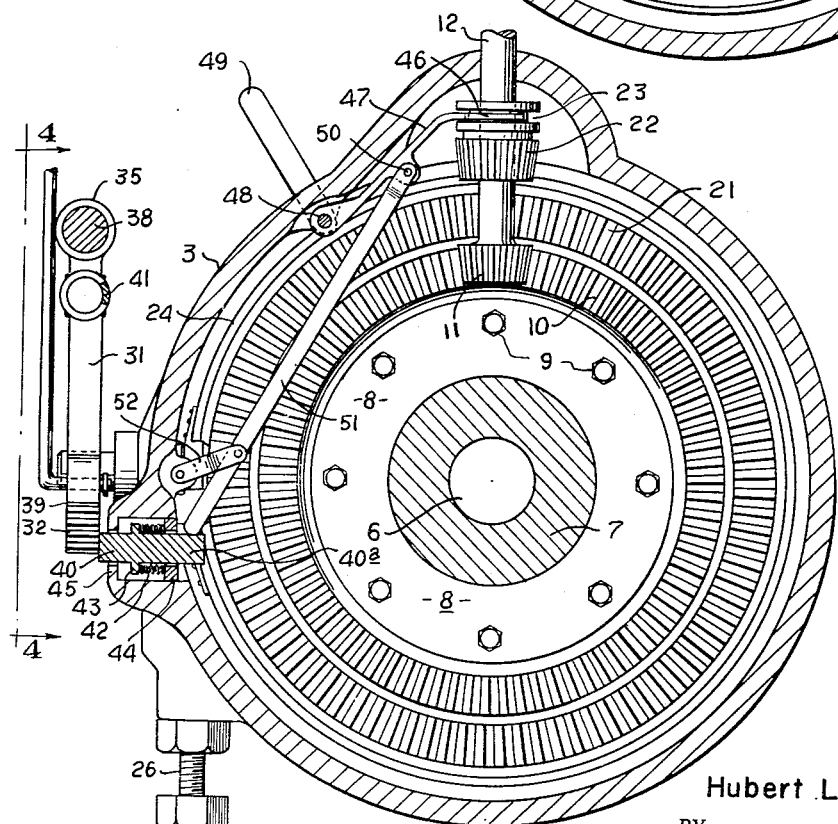
Fig. 5 is a cross-section taken on line 5—5 of Fig. 1.

Fig. 5 illustrates an interlock mechanism, that prevents sliding pinion 22 from being moved into engagement with bevel gears 21 when latch bar 40 is in the depressed position, and permits it to be so engaged when the gear segments 32 are enmeshed and the latch bar 40 is in the raised position.

Latch bar 40 is biased outward by compression springs 42 as described above. These springs are in a cavity within the housing wall and work between protrusion 43 on the bar and insert 44 on the interior of the housing. The insert 44 and ledge 45 guide the bar 40. The ledge 45 with protrusion 42 also limit the outward travel of the bar. A portion 40a of the bar extends within the housing.

Shift yoke 46, which fits in groove 23 of sliding pinion 22 as mentioned above, is on the end of shift lever 47 which is pivoted to the housing 3 by rod 48. The rod 48 may be rotated by any convenient means such as handle 49, which is connected to a portion of rod 48 which extends through the housing. About midway between rod 48 and shift yoke 46 on lever 49 is a pin 50 by which pitman 51 is connected. This pitman extends from pin 50 to portion 40a of the latch bar. The pitman 51 is supported intermediate its ends by link 52 which is pivoted to the housing 3 and the pitman as shown.

*Operation*

One mode of operation is such to embody the second and third feature mentioned above. The mechanism is as shown in the accompanying drawing. That is, slide pinion 22 is not engaged with drum gears 21; levers 31 are capable of independent motion with gear segments 32 unengaged; and latch bar 40 is depressed and held in that position against the effort of springs 42 by gear segments 32.

Under these conditions spring 41 applies a force to levers 31 such as to impel the left one in a clockwise direction of rotation and the right one in a counter-clockwise direction. This force is in turn transmitted to each rocker arm 29 and is in such a direction, acting through pins 28 and fixtures 27, as to hold the inner bands 24 tight on their respective drums 18, and to hold the brake bands 25 loose on their respective drums 14. In this condition drums 18 are stationary while drums 14 are free to rotate.

The engine delivers power through the stepped speed transmission of the tractor to the drive shaft 12, causing it to rotate and in turn causing drive pinion 11 to rotate, it in turn drives ring-gear 10, ring-gear flange 8, ring-gear sleeve 7 and the two sun gears 13.

By reference to Fig. 3, it may be seen that as sun gear 13 is driven in the direction shown by arrow *a* it will in turn cause the planet gears 17 to rotate in the direction shown by arrow *b*. Now since the planet gears 17 mesh with the internal gear 20 in the inner drum 18, and since inner drum 18 is held stationary, planet gears 17 will be forced to roll around in the internal gear 20 in the direction of arrow c, and in so doing they will carry with them pins 15 which in turn cause brake drum 14 to rotate, which will in turn drive axle shaft 1 to which it is attached. The same sequence in an identical manner drive axle shaft 2 in the same direction. Since the drives from the drive pinion 11 to axles 1 and 2 are direct and positive, the two axles are necessarily driven at the same speed and in every respect as if the rear wheels of the tractor were solidly fixed to a common shaft. This mode of operation provides the maximum tractive effort where maneuverability is not a prime requisite.

For short radius turning with power, as at the furrows ends in plowing, the following mode of operation is available. If right hand lever 31 is rotated in a clockwise direction by either pull-rod 36 or control-rod 37 this movement will extend spring 41 and apply extra tension to the inner band 24 on the left hand drum 18—which must take over the total driving load—while releasing the right hand inner band 24, allowing right hand drum 18 to rotate freely. The continued movement of the lever 31 and the rocker arm 29 will apply brake tension to the right hand brake drum 14.

With the drum 18 thus free to rotate, it can be seen that as sun gear 13 rotates in the direction of arrow a it causes the planet gear 17 to rotate in the direction of arrow b, but now with the drum 18 free to rotate, planet gears 17 will cause it to rotate in the direction of arrow d, and since such rotation is free and without resistance, there will be no tendency for planet gears 17 to progress in the direction of arrow c nor any tendency to move pins 15 nor brake drum 14 nor axle 2, in the direction of arrow c. Thus it may be seen that the release of band 24 cuts the power off of that particular axle and that further rotation of lever 31 will apply braking to that wheel. Thus this invention accomplishes the second and third ideal features above; which were to provide a continuous axle type drive with means for cutting off power from either wheel and braking that wheel.

To accomplish the first ideal feature above—namely, to have a conventional differential drive with synchronized brakes—the following mode of operation is available.

By actuating both pull-rods 36, both levers 31 are rotated in a direction to release both drums 18 by releasing drum bands 24, which also causes gear segments 32 to mesh, and as they mesh they move off of latch bar 40 allowing it to rise and to henceforth block the return of gear segments 32 to a position where they could become unmeshed or disengaged. In this condition levers 31 must move together and they may thus be actuated by either foot pedal or by motion in either direction of control rod 37. In this state both drums 18 are free to rotate as their bands 24 have been released and are held released by latch bar 40. However, further rotation of levers 31 by either pull-rods 36 or by rod 37 will apply the brakes to brake drums 14 simultaneously. Note that it is impossible to brake only one axle when operating with bar 40 raised. It should be further noted that with both drums 18 free to rotate as they now are, no power may be delivered to either wheel.

With latch bar 40 in the raised position, the pinion 22 may be engaged with gears 21. The same clockwise motion produced by handle 49 which engages pinion 22 will move the end of pitman 51 into the space otherwise occupied by portion 40a of the bar.

Since sliding pinion 22 is free to rotate on its axis, it prevents drums 18 from both rotating in the same direction, but permits them to rotate in opposite directions at equal speeds. This type of restriction on the motion of drums 18 can be shown to produce a differential type of drive to the two axles wherein the individual axle speeds may vary but the sum of their speeds remains in a fixed ratio to the speed of the drive pinion 11. That is to say, in negotiating a turn, at constant engine or drive pinion speed, the outside wheel will increase in speed and the inside wheel will decrease in speed, but the amount of the increase will equal the amount of the decrease and the sum of the wheel speeds will remain unchanged.

One mode of operation of this system would be where neither drum 18 was in motion and the sliding pinion 22 was stationary. In this condition the speed of the two axles would be equal and the gear trains would be operating as described above. In that state of operation planet gears 17 are rotating in the direction of arrow b and are rolling on stationary internal gear 20 and carrying pins 15 in the direction of arrow c. It should now be noted that if it were desirable to slow down the motion of pins 15 it could be done by causing the internal gear 20 in drum 18 to move slowly in the direction of arrow d. This would slow down the rotation of the brake drum 14 and axle 1. On the other hand, if it were desirable to speed up the motion of pins 15, and consequently the brake drum 14 and axle 1, it could likewise be done by causing drum 18 and its internal gear 20 to move slowly in a direction opposite to arrow d. Thus to speed up one axle it is necessary to let its inner drum rotate in one direction at a certain rate, and to slow down the other axle an equal amount it is necessary to let its inner drum rotate in the opposite direction at an equal rate—and that is the type of motion to which the sliding pinion 22 limits the inner drum—equal velocities in opposite directions.

Thus, with this mode of operation the first ideal feature above is accomplished. That is, normal differential motion of the axles accompanied by simultaneous braking action on both axles.

To convert from this type of operation to the fixed axle type, it is necessary by handle 49 to shift sliding pinion 22 out of engagement with the gears 21 on the inner drums 18. This moves pitman 51 from the space occupied by portion 40a of the bar, and then the bar 40 may be depressed, then gear segments 32 are rotated by spring 41 in a direction to disengage and to hold latch bar in the depressed position. The mechanism is then in the position illustrated.

The interlock not only prevents damage to the gears due to attempting operation by both modes simultaneously; but also provides safety to the operator. The tractor would be operated with the sliding pinion 22 disengaged (as shown in the drawing) only at slow speeds when traction was critical. Then when a brake is applied to one wheel and the tractor turns sharply, the centrifugal force would not be sufficient to dislodge the operator from his seat. When the tractor is operated at high speeds and a brake on one wheel only might throw the operator off the tractor, the operation would with the pinion 22 engaged; therefore, it would be impossible to apply the brake to one wheel only.

It will be apparent that the embodiments shown are only exemplary and that various modifications can be made in construction, materials, and arrangement within the scope of the invention as defined in the appended claims.

I claim as my invention:

1. In a tractor transmission having two co-axial axle shafts, a first brake drum attached to each shaft, planet gears rotatably attached to each first brake drum, an internal gear mounted for rotation on each shaft, said planet gears meshing both with a sun gear and the internal gears, second drums attached to each internal gear, brake band means for engaging each brake drum, said sun gears being attached together so that they rotate about the shafts as a unit, and means for rotating the sun gears; the improvement comprising: second gears on each second drum, a pinion mounted for movement in a radial direction to the axle shafts, and means for selectively meshing the pinion with the second gears or disengaging it from the second gears.

2. The invention as defined in claim 1 with the addition of interlock means for preventing the simultaneous engagement of said pinion with said second gears, and said brake band means with said second brake drums.

3. In a tractor transmission having a housing; two axle shafts rotatably mounted on the housing; a planetary gear system for each axle; a common means for driving said planetary gear system; each of said planetary gear systems having three elements: a sun gear, an internal gear, and a planet drum with planet gears rotatably attached; said three elements rotatably mounted about a common axis; one of said elements connected to its axle shaft; a second of said elements connected to the means for driving; a third of said elements having means for preventing its rotation; and brake means for preventing the rotation of each axle shaft; the improvement comprising: additional gear teeth on each of said third of said elements a pinion mounted for movement toward and away from said common axis; and means for selectively meshing said pinion with the additional gear teeth on both of said elements.

4. The invention as defined in claim 3 with the addition of interlock means for preventing the meshing of said pinion with said additional gear teeth at a time said brake means is preventing the rotation of this element.

5. In a tractor transmission having a housing; two axle shafts rotatably mounted on the housing; a planetary gear system for each axle; a common means for driving said planetary gear systems; each of said planetary gear systems having three elements: a sun gear, an internal gear, and a planet drum with planet gears rotatably attached; said three elements rotatably mounted about a common axis; one of said elements connected to its axle shaft; a second of said elements connected to the means for driving; inner brake means for preventing the rotation of the third of said elements; and outer brake means for preventing the rotation of each axle shaft; the improvement comprising: two parallel control shafts mounted for rotation on the housing; a rocker arm on each control shaft connecting said outer brake means and said inner brake means of each axle, so arranged and constructed that only the outer brake means or the inner brake means is operative at any given time; gear segments on the control shaft so arranged and constructed that if the shafts are so positioned that either inner brake means is operative the segments do not mesh, but if the shafts are so positioned that neither inner brake means is operative the segments mesh.

6. The invention as defined in claim 5 wherein when the segments are meshed, the rocker arms are so constructed and arranged that movement of one arm in such a direction to activate its outer brake means will move the other arm to also activate its outer brake means.

7. The invention as defined in claim 6 with the addition of a spring under strain connecting the segments, said spring biasing the control shafts in such a direction wherein the segments are not meshed.

8. The invention as defined in claim 7 with the addition of a sleeve connected to each gear segment, a rod passing through each sleeve, an enlarged portion on the rod between the sleeves, so that movement of the rod in one direction will rotate one control shaft in such a direction to increase the strain of the spring and movement in the other direction will rotate the other shaft in a direction to increase the strain of the spring.

9. The invention as defined in claim 7 with the addition of a latch bar mounted for sliding movement in the housing; said sliding movement in a direction parallel to said control shafts; the bar being located so that when the segments are not meshed they are in the path of movement of the bar, however when the control shafts are rotated so that the segments are meshed and both inner brake means inoperative, then the segments are not in the path of said bar; and a spring biasing the bar toward the segments; whereby the bar may be raised and block the return movement of said segments.

10. The invention as defined in claim 5 with the addition of additional gear teeth on each of said two elements which have the inner brake means; a pinion shaft located in a plane normal to the said common axis; a pinion mounted for sliding on said pinion shaft; and means for selectively meshing said pinion with the additional gear teeth on both of said elements.

11. The invention as defined in claim 9 with the addition of additional gear teeth on each of said two elements which have an inner brake means; a pinion shaft located in a plane normal to the said common axis; a pinion mounted for sliding on said pinion shaft; and means for selectively meshing said pinion with the additional gear teeth on both of said elements.

12. This invention as defined in claim 11 with the addition of interlocking means for preventing said pinion from meshing with the additonal gear teeth when either of the segments are in the path of movement of the latch bar.

13. The invention as defined in claim 11 with the addition of interlock means for maintaining the latch bar in the raised position, that is in the path of the segments, when the pinion is meshed with the additional gear teeth.

14. A tractor transmission comprising: a housing; a right axle shaft; a left axle shaft co-axial with the right axle shaft; the axle shafts rotatably mounted in abutting position in the housing; a sleeve rotatably mounted on both axle shafts; a ring gear on the sleeve; a shaft normal to the axle shafts; a drive pinion on the normal shaft meshing with the ring gear; a sun gear on each end of the sleeve; two internal gears rotatably mounted on the sleeve; a planet drum attached to each shaft outboard from the sun gears; a plurality of pins in each planet drum parallel to the axle shafts; planet gears rotatably mounted on the pins; said planet gears meshing with both the sun gear and the internal gear; additional gear teeth on each internal gear; the additional gear teeth facing each other; a sliding pinion on said normal shaft; means for sliding the sliding pinion into meshing relationship with the additional gear teeth; first brake bands encircling each planet drum; second brake bands encircling each internal gear; and means for activating each brake band.

15. The invention as defined in claim 14 wherein said means for activating each brake and clutch band includes: a right control shaft rotatably mounted in the housing normal to the axle shafts; a left control shaft rotatably mounted in the housing normal to the axle shafts; a rocker arm attached to each control shaft; one end of each first brake band being attached to one side of a rocker arm; the other side of each rocker arm being attached to a second brake band; and a lever attached to each control shaft.

16. The invention as defined in claim 15 with the addition of a gear segment attached to each lever; a spring extending from one lever to the other; a latch bar mounted for translational movement parallel to the control shafts in the housing; and a bar spring biasing the latch bar toward the segments.

17. The invention as defined in claim 16 with the addition of a sleeve on each lever; a rod extending through the sleeves; and an enlarged portion on the rod between the sleeves.

18. The invention as defined in claim 16 with the addition of interlock means for preventing the operation of said means for sliding the sliding pinion responsive to the location of the latch bar.

References Cited in the file of this patent

UNITED STATES PATENTS

| | | |
|---|---|---|
| 1,387,009 | Norelius | Aug. 9, 1921 |
| 2,569,651 | Banman | Oct. 2, 1951 |